United States Patent [19]

Arai et al.

[11] Patent Number: 4,818,611
[45] Date of Patent: Apr. 4, 1989

[54] HIGH-PURITY SILICON NITRIDE FIBERS

[75] Inventors: Mikiro Arai; Osamu Funayama; Hayato Nishii, all of Ohi; Takeshi Isoda, Niiza, all of Japan

[73] Assignee: Tao Nenryo Kogyo K.K., Tokyo, Japan

[21] Appl. No.: 930,803

[22] Filed: Nov. 13, 1986

[30] Foreign Application Priority Data

Nov. 19, 1985 [JP] Japan ................................ 60-257824

[51] Int. Cl.[4] ............................................. D02G 3/00
[52] U.S. Cl. .................................. 428/364; 423/344; 428/359; 501/95; 501/97; 264/65
[58] Field of Search ................ 428/359, 364; 423/344, 423/324; 501/95, 97; 264/65

[56] References Cited

U.S. PATENT DOCUMENTS 3,244,480  4/1966  Johnson et al. ...................... 501/97
3,640,693  2/1972  Galasso et al. ................. 423/344 X
4,036,653  7/1977  Jacobson ............................... 501/97
4,101,616  7/1978  Buljan ............................... 501/95 X
4,482,669  11/1984 Seyferth et al. ..................... 524/442

Primary Examiner—Lorraine T. Kendell
Attorney, Agent, or Firm—Frank J. Jordan; C. Bruce Hamburg; Manabu Kanesaka

[57] ABSTRACT

Silicon nitride fibers having a carbon content of 5 weight percent or less have high heat insulating properties and favorable mechanical properties and are useful as heat resistant, highly insulating materials or reinforcing agents for composite materials, particularly in the aerospace industry. Such high purity silicon nitride fibers are produced by spinning a solution of perhydropolysilazanes, an inert solvent and a spinning agent into fibers, preferably continuous fibers, and firing the spun fibers at 800° to 1300° C. in an inert atmosphere to form silicon nitride fibers of high purity.

2 Claims, 2 Drawing Sheets

HIGH-PURITY SILICON NITRIDE FIBERS

The present invention relates to high-purity silicon nitride fibers and a process for producing them. The high-purity silicon nitride fibers are very useful as heat-resistant, high-insulating materials or as reinforcing agents for composite materials.

BACKGROUND OF THE INVENTION AND RELATED ART

Silicon nitride has been attracting much attention for its favorable properties, and the research thereof has recently led to remarkable developments. It has been already applied commercially to the production of cutting tools, mechanical seals, etc., for its resistance to heat and wear, and will find wide use for bearings, turbosupercharger rotors, etc., in the near future. It will play an important role in the production of gas turbine blades, adiabatic engines, heat exchangers for high-temperature gas furnaces and other equipment which operates at very severe conditions.

It is well known that silicon nitride when formed into fibers exhibits more effectively than in block form its inherent properties, such as mechanical strength, resistance to heat, impacts, oxidation and chemicals, electrical insulation, and wettability with metals. The fibers have another advantage of being more amenable to molding. Economic production of the fibers, therefore, will open up new areas into which silicon nitride can make inroads. More specifically, silicon nitride will be used as a heat-resistant material for mesh belts, conveyor belts, curtains and filters, or as a reinforcing agent in various composite material for engine parts, fan blades and aircraft structures when the fibers are processed into woven fabrics, felts, ropes, yarns or chopped strands.

Various processes have been proposed for the production of silicon nitride fibers. Some of the more important processes are listed below:

(1) a process, wherein silicon monoxide (SiO) prepared by reducing silicate at a high temperature is reacted with ammonia and hydrogen at 1425° to 1455° C. to form fibrous silicon nitride, 5 to 30 μm in diameter and about 370 mm long, on a graphite substrate. (Cunningham et al., 15th Nat. SAMPE Symp., 1969), (2) a process, wherein an organic polycondensate having one or more silazane (SiN) groups is melt-spun to form a fibrous polymer, which is fired in an ammonia atmosphere (Ishikawa et al., Japanese Patent Laid-Open No. 200210/1982), and (3) a process, wherein organosilazane fibers prepared by melt spinning or dry spinning organosilazanes are fired in an inert gas atmosphere to produce silicon carbide/silicon nitride composite fibers (G. Winter et al., Japanese Patent Laid-Open No. 69717/1974; W. Verbeek et al., Japanese Patent Laid-Open No. 20206/1974; Penn et al., "J. of Applied Polymer Science", Vol. 27, 3751-3761 (1982); Penn et al., I.E.C., "Proc. Des. Dev.", Vol. 23, No. 2, 217-220 (1984); Seyferth et al. U.S. Pat. No. 4,482,669).

Each of the above processes and silicon nitride fibers produced thereby have specific problems. The process (1) is incapable of making silicon nitride into continuous fibers, and is not suited for mass production because of its poor controllability. The major problems associated with the processes (2) and (3) result from higher carbon contents in their starting fibers, with the result that the final products will have higher concentrations of silicon carbide and/or free carbon. This may sometimes cause formation of cracks, voids and pores during the thermal decomposition step, which will degrade some of the properties inherent in silicon nitride, such as electrical insulation, mechanical strength and resistance to thermal shocks. Furthermore, the fibers prepared by the processes (2) and (3) are insufficient in tensile strength and electrical resistivity, which are known in the art to have to be in the order of 41 to 142 kg/mm² and 7×10⁸ Ω·cm, to be used for aerospace materials.

SUMMARY OF THE INVENTION

The primary objective of the present invention is to solve the above problems of silicon nitride fibers and the processes for producing the same.

After intensive and extensive investigations made to solve the above problems, the inventors have found that the problems associated with conventional silicon nitride fibers and the processes therefor can be solved by using perhydropolysilazanes as the main starting material. The present invention has been completed on the basis of this finding.

The present invention provides new silicon nitride fibers characterized by comprising continuous fibers having a carbon content of 5 wt % or less. The new, high-purity silicon nitride fibers are produced by spinning a starting material mainly comprising perhydropolysilazanes, and then firing the spun fibers. The present invention also provides this new production process.

DETAILED DESCRIPTION OF THE PREFERRED EMBODIMENTS

Figure 1:
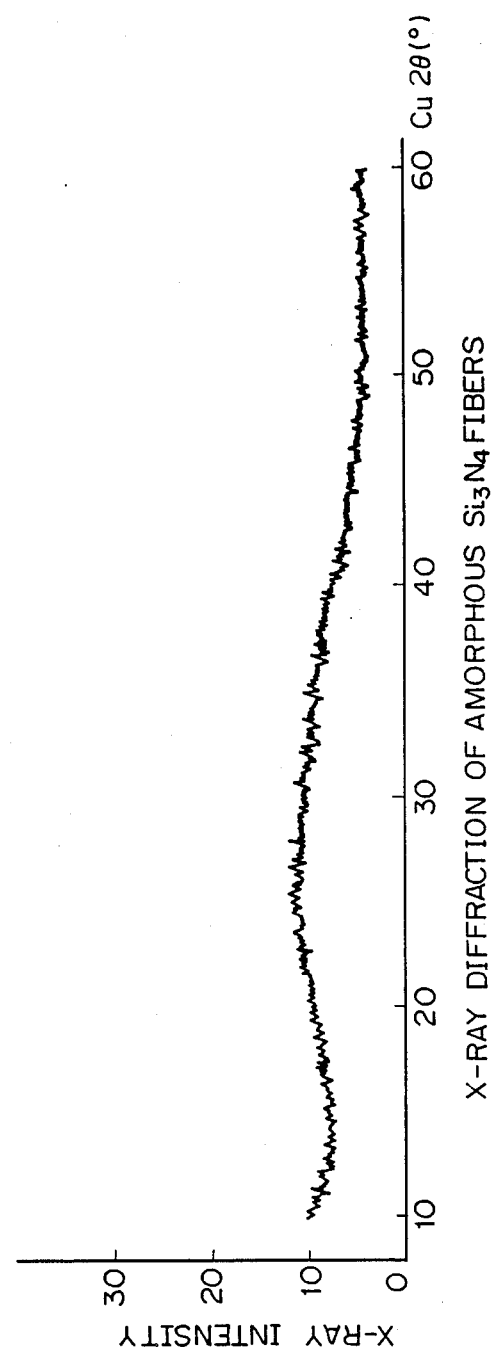
FIG. 1 is an X-ray diffraction pattern of silicon nitride fibers of the present invention.

The perhydropolysilazanes used as the main starting material in the process of the present invention are obtained by ammonolyzing one or more dihalosilanes of the formula: $SiH_2X_2$ or $Si_2H_4X_2$, wherein X represents F, Cl, Br or I, directly or after formation of an adduct with a Lewis base. The perhydropolysilazanes are polymers having mainly a skeleton of the formula (1):

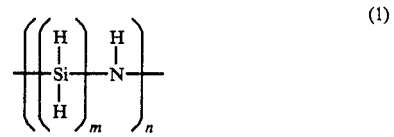

where, m=1 or 2, and n represents the degree of polymerization.

Perhydropolysilazanes are characterized in that they comprise only silicon, hydrogen and nitrogen atoms but no carbon atoms.

The silicon nitride fibers of the present invention are characterized by an extremely low carbon content. It is desirable, therefore, that the starting material is free of carbon atoms as far as possible. The starting material, however, may contain silazanes having carbon atoms so far as the carbon content of the final product (silicon nitride fibers) is 5 wt % or less. Examples of the silazanes having carbon atoms include (A) those having a skeleton of the formula (2):

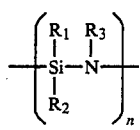

where $R_1$, $R_2$ and $R_3$ may be the same or different, and each represents a hydrogen atom or an alkyl, aryl, vinyl or allyl group with the proviso that at least one of $R_1$, $R_2$, and $R_3$ has a carbon atom, and n represents the degree of polymerization; (B) silazanes having both skeletons of the above formulae (1) and (2); (C) silazanes not having the skeleton represented by the formula (2), $CH_3Si(NHCH_3)_3$, $(CH_3)_2Si(NHCH_3)_2$ or ammonolysis products of $RSiX_3$ where R represents $CH_3$ or $C_6H_5$, and X represents a halogen atom; and (D) the polymers thereof.

Further, polysilanes, polycarbosilanes, etc., may be added to the starting material.

Though the degree of polymerization (n) of the perhydropolysilazanes used in the present invention is not particularly limited, it is preferably 15 or more, since when it is 14 or less, the fluidity becomes excessively high and make spinning difficult. Though the upper limit of the degree of polymerization is not particularly limited as long as the polymer is soluble in the solvent usually it is preferably 40 or less to make the synthesis proceed smoothly.

Applicants previously disclosed a process for producing perhydropolysilazanes of the above formula (1), particularly those having a degree of polymerization (n) of 15 to 40 (see the specification of Japanese Patent Laid-Open No. 207812/1984). The polymers of perhydropolysilazanes proposed by the applicants have a higher degree of polymerization than those of the perhydropolysilazanes having a degree of polymerization as low as 7 to 15, proposed by Stock and Seyferth [Stock et al. Berichte, Vol. 54, 740 (1921), or Seyferth et al., U.S. Pat. No. 4,397,828]. The former are in the form of a highly viscous oil or solid when isolated, while the latter are in the form of a liquid which cannot be solidified or which is solidified slowly over several days, when isolated. Thus, the properties of the former are completely different from those of the latter.

The starting material is dissolved in an inert solvent for the later spinning. The usable inert solvents include, for example, hydrocarbons, halogenated hydrocarbons, ethers, nitrogen compounds and sulfur compounds. Examples of preferred solvents include hydrocarbons such as pentane, hexane, isohexane, methylpentane, heptane, isoheptane, octane, isooctane, cyclopentane, methylcyclopentane, cyclohexane, methylcyclohexane, benzene, toluene, xylene and ethylbenzene; halogenated hydrocarbons such as methylene chloride, chloroform, carbon tetrachloride, bromoform, ethylene chloride, ethylidene chloride, trichloroethane, tetrachloroethane and chlorobenzene; ethers such as ethyl ether, propyl ether, ethyl butyl ether, butyl ether, 1,2-dioxyethane, dioxane, dimethyldioxane, tetrahydrofuran, tetrahydropyran and anisole; nitrogen compounds such as diethylamine, trietylamine, piperidine, pyridine, picoline, lutidine, ethylenediamine and propylenediamine; and sulfur compounds such as carbon disulfide, diethyl sulfide, thiophene and tetrahydrothiophene.

Perhydropolysilazanes are dissolved in a suitable amount of the solvent to make a viscous solution. Though the solution thus prepared has a spinnability insufficient for dry spinning, its spinnability can be increased sufficiently by adding thereto a small amount of one or more organic, macromolecular spinning assistants. Examples of the assistants include polyethers, polyamides, polyesters, vinyl polymers, polythioethers and polypeptides. Among them, polyethylene oxide, polyisobutylene, polymethyl methacrylate, polyisoprene, polyvinylacetate and polystyrene are particularly preferred.

Though the interrelationship between the concentration of perhydropolysilazanes and spinnability of the solution cannot be described in a general manner, since it varies depending on the degree of polymerization of perhydropolysilazanes, solvent and kind and amount of the spinning assistant, usually a solution having a viscosity at room temperature of 1 to 5000 poise is preferred. Therefore, viscosity of the spinning solution must be adjusted within said range. To adjust viscosity in said range and simultaneously to adjust carbon content of the final product to 5 wt % of less, the amount of the spinning assistants will be in the range from 0.0001 to 0.1 parts by weight per part by weight of perhydropolysilazanes in the spinning solution. The solution is concentrated by an ordinary process, such as vacuum distillation, to obtain a spinning solution having a suitable viscosity. The spinning solution, after being concentrated, contains perhydropolysilazanes at 5 to 95 wt %.

The spinning is effected advantageously by a dry spinning process. In addition, centrifugal or blow spinning processes can also be employed. The spinning is effected in an inert gas atmosphere at room temperature or, if necessary, by heating the spinning solution. In the latter case, the heating must be effected carefully, since thermal decomposition of the perhydropolysilazanes start to occur at above 100° C. After the spinning, the fibers are dried either by heating under reduced pressure, or passing a hot inert gas over them.

Thus, fibers, particularly continuous fibers, of perhydropolysilazanes are produced, which are white in color. They have a sufficiently high strength even before being fired that the process can be modified in such a way that the fibers are processed into yarns or woven fabrics before firing.

An important feature of the process of the present invention for producing silicon nitride fibers is that high-purity, continuous fibers of silicon nitride can be obtained. However, this process can be employed for the production of not only filaments (continuous fibers) but also short fibers. The short fibers can be obtained by cutting the fired, continuous silicon nitride fibers; by cutting the precursors, comprising the continuous fibers of perhydropolysilazanes, into short fibers and firing them to produce short silicon nitride fibers; or by directly forming precursor perhydropolysilazanes in the form of short fibers and then firing them to produce short silicon nitride fibers.

The dry perhydropolysilazanes are preferably heat-treated at around 100° C. in an inert gas atmosphere, to ensure that the solvent is completely removed and, at the same time, to minimize formation of cracks, voids and pores during the firing step by promoting cross-linking between the molecular chains of perhydropolysilazanes.

The perhydropolysilazane fibers prepared by the process of the present invention can be fired directly, i.e., without additional curing, since they are infusible by heat. The gas atmosphere is preferably of nitrogen, but ammonia or a gaseous mixture of nitrogen, ammonia, argon, hydrogen, etc., may be employed as the atmosphere gas.

The firing temperature is usually in the range between 700° and 1900° C., below which the firing will take an excessively long time, and above which energy may be excessively wasted and/or the fibers may be degraded by heat. One of the important characteristic of the present invention is that the process involves firing which is effected at 1300° C. or lower, preferably at 800° to 1300° C., and more preferably at 900° to 1200° C., to produce amorphous silicon nitride fibers. Some inorganic fibers produced by conventional processes, such as carbon, silicon carbide, silicon oxynitride and alumina fibers, are generally characterized in that amorphous fibers have more favorable mechanical properties but lower moduli of elasticity than crystalline fibers. It is believed that amorphous silicon nitride is transformed into the $\alpha$-crystalline phase at 1200° C. or higher. The conventional processes which involve firing effected at 1200° C. or higher, therefore, cannot yield amorphous silicon nitride fibers. Continuous organosilazane fibers can be amorphous when fired at 1200° C. or lower; however, they are generally of low-purity, containing high proportions of impurity carbon atoms which may cause formation of silicon carbide and/or free carbon when exposed to higher temperatures. However, it is notable that amorphous silicon nitride fibers produced by the process of the present invention may be further treated at higher temperatures into a crystalline phase.

It is more desirable to fire the silicon nitride fibers under tension to make the product mechanically stronger.

The most important feature of the process of the present invention comes from the use of perhydropolysilazanes represented by the formula (1), which are free of carbon in their molecular structures. This will solve those problems involved in the above-mentioned prior art processes (2) and (3) which produce products containing high proportions of silicon carbide and/or free carbon. A typical elementary composition of the product of the present invention is as follows:

Si: 55 to 70 wt %
N: 25 to 40 wt %
C: 5 wt % or less

Thus, the product of the present invention is much lower in carbon content, and hence much higher in resistivity (2 to $7 \times 10^{10} \Omega \cdot cm$) than those resulting from the processes (2) and (3).

The product of the present invention will be contaminated with oxygen which is introduced therein in a series of the steps from feed preparation to firing, since dihalosilanes as the starting material and perhydropolysilazanes obtained therefrom by ammonolysis are highly susceptible to oxygen and moisture in the air. The oxygen content, usually at 5 wt % at the highest, can be greatly reduced by designing the production system air-tight. It is also possible to control oxygen content in the final product to a prescribed level, such as that associated with silicon oxynitride, by adjusting the oxygen and/or water concentration in each production step, or by further treating it with an oxygen-containing compound.

The process of the present invention can produce continous silicon nitride fibers which have the following favorable characteristics by combining the spinning and firing steps presented earlier.

fiber size: 10 to 30 μm in diameter
tensile strength: 30 to 220 kg/mm$^2$
modulus of elasticity: 7 to 30 tons/mm$^2$, and
resistivity: 2 to $7 \times 10^{10} \Omega \cdot cm$ Such continuous fibers are inconceivable by the conventional process (1) which tries to produce short silicon nitride fibers in a gas phase.

The higher-molecular-weight perhydropolysilazanes (degree of polymerization: 15 to 40) as the desired starting material for the process of the present invention are in the form of either a high-viscosity oil or solid when isolated. This sharply distinguishes them from the lower-molecular-weight perhydropolysilazanes (degree of polymerization: 7 to 15), as discussed earlier, and provides the process of the present invention with several advantages of industrial importance, as follows, in addition to the production of high-purity silicon nitride, which is common to the processes using perhydropolysilazanes as the starting material:

(i) Spinnability and solidifiability of the product immediately after the spinning are improved remarkably. The lower-molecular-weight perhydropolysilazanes are unsuitable for mass production, because they have an extremely low solidifiability and, hence, require either heating for a long time or plasma irradiation, in order to promote cross-linking between the molecular chains after spinning, although the spinnability can be adjusted to an acceptable level by the aid of a spinning assistant; and (ii) Loss of low-boiling components and thermal decomposition products can be controlled to a very small extent during the firing step, with the result that the product yield after firing can be increased to as high as 80%. By contrast, the product yield with a process using the lower-molecular-weight perhydropolysilazanes will be about 69%.

As described earlier, the silicon nitride fibers of the present invention can be amorphous depending on the temperature used for firing. The amorphous silicon nitride fibers have higher tensile strengths and lower moduli of elasticity than the polycrystalline, by about 10 to 120 kg/mm$^2$ and 0 to 6 tons/mm$^2$, respectively. Thus, either amorphous or polycrystalline silicon nitride fibers can be produced by the process of the present invention interchangeably for the final application, e.g., the amorphous as heat-resistant, structural materials and the polycrystalline as high-modulus reinforcing agents for composite materials.

The following examples will further illustrate the present invention, but by no means limit the invention:

EXAMPLE 1

A 1-L four-necked flask was provided with a gas-inlet tube, mechanical stirrer and Dewar condenser. The reactor was purged with oxygen-free, dry nitrogen, to which 490 mL of degassed dry pyridine was added and then cooled with ice. Then, 51.6 g of dichlorosilane was added thereto to form a white, solid adduct (SiH$_2$Cl$_2$·2C$_5$H$_5$N) The reaction mixture was cooled with ice, to which 51.3 g of ammonia purified by passing it through sodium hydroxide and activated carbon was added, with nitrogen gas as a carrier while stirring the contents.

On completion of the reaction, the reaction mixture was separated centrifugally into the supernatant and residual phases. The latter was washed with dry methylene chloride to extract remaining perhydropolysilazanes, the extract being combined with the supernatant phase. The mixture was then filtered in a nitrogen atmosphere to obtain about 850 mL of the filtrate. The solvent was distilled off from 5mL of the filtrate under a reduced pressure to obtain 0.103 g of perhydropolysilazanes in the form of a resinous solid.

50.2 mg of polyethylene oxide (molecular weight: $5 \times 10^6$) was added to 240 mL of the filtrate containing perhydropolysilazanes and the mixture was stirred vigorously for 1 hour and concentrated by distilling off the solvent under a reduced pressure to obtain 30 wt % spinning solution of perhydropolysilazanes in pyridine. The spinning solution was filtered, defoamed and spun by a dry spinning process in a nitrogen atmosphere to obtain white fibers. The fibers were dried at 50° C. under a reduced pressure for 4 hours, heat-treated at 100° C. in a nitrogen atmosphere for 3 hours and heated at 1050° C. in a nitrogen atmosphere in a closed electric furnace for 5 hours to obtain black fibers.

Figure 2:
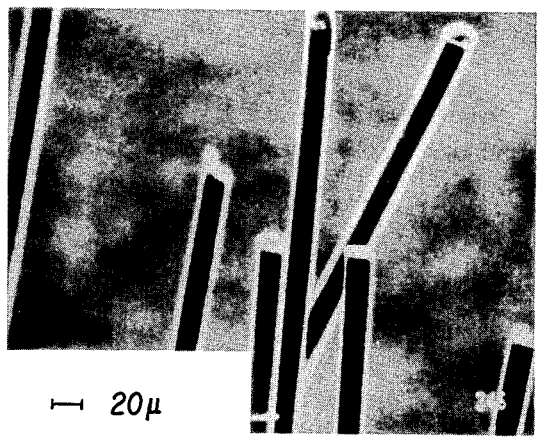
FIGS. 2 and 3 are electron micrographs of silicon nitride fibers of the present invention.
Figure 3:
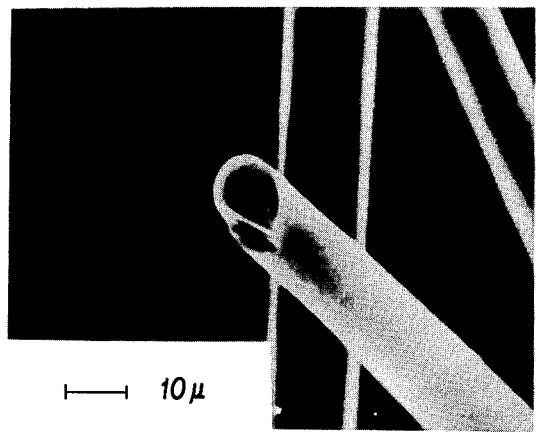

According to the chemical analysis, the obtained fibers had the following elementary composition: 62.5 wt % of silicon, 34.3 wt % of nitrogen, 0.4 wt % of carbon, 3.1 wt % of oxygen and 0.01 wt % or less of metal elements (impurities). According to X-ray diffractometry, the product was amorphous silicon nitride as shown in FIG. 1. FIGS. 2 and 3 present electron micrographs (SEM) of the fibers. The fibers were dense, free of cracks or voids and had a diameter of 10 to 30 $\mu$m, tensile strength of 40 to 220 kg/mm$^2$, modulus of elasticity of 9 to 30 tons/mm$^2$ and electric resistivity of 2 to $7 \times 10^{10} \Omega \cdot$cm.

EXAMPLE 2

0.173 g of polyethylene oxide (molecular weight: $5 \times 10^6$) was added to 240 mL of the filtrate containing perhydropolysilazanes prepared in Example 1. The mixture was stirred vigorously for 1 hour, and was concentrated by distilling off under a reduced pressure to furnish a spinning solution. This solution was spun, and the resultant fiber was dried and heat-treated in the same manner as in Example 1 to prepare black fibers having a diameter of 10 to 30 $\mu$m.

According to X-ray diffractometry, the fibers were amorphous. According to the chemical analysis, the product had the following elementary composition: 60.6 wt % of silicon, 33.0 wt % of nitrogen, 2.3 wt % of carbon, 3.9 wt % of oxygen and 0.01 wt or less of metal elements.

EXAMPLE 3

0.247 g of polystyrene (molecular weight: $2.5 \times 10^7$) was added to 240 mL of the filtrate containing perhydropolysilazanes prepared in Example 1. The mixture was stirred vigorously for 1 hour and was concentrated by distilling off the solvent under a reduced pressure to furnish a spinning solution. This solution was spun and the resultant fibers were dried and heat-treated in the same manner as in Example 1 to prepare black fibers having a diameter of 18 to 30 $\mu$m.

According to X-ray diffractometry, the fibers were amorphous. According to the chemical analysis, the product had the following elementary composition: 61.4 wt % of silicon, 32.1 wt % of nitrogen, 3.5 wt % of carbon, 3.4 wt % of oxygen and 0.01 wt % or less of metal elements.

EXAMPLE 4

The dried and heat-treated perhydropolysilazane fibers prepared in Example 1 were heated to 1300° C. in a nitrogen atmosphere for 4 hours to prepare black fibers. Powder X-ray diffractometry of the black fibers detected an intense peak due to $\alpha$—Si$_3$N$_4$ and a weak peak due to Si. According to the chemical analysis, the product had the following elementary composition: 60.4 wt % of silicon, 39.1 wt % of nitrogen, 0.3 wt % of carbon, 0.4 wt % of oxygen and 0.01 wt % or less of metal elements. The fibers had a diameter of 15 to 20 $\mu$m, tensile strength of 30 to 100 kg/mm$^2$ and modulus of elasticity of 15 to 30 tons/mm$^2$.

As described above, high-purity silicon nitride fibers having an extremely low carbon content are provided by the present invention. The high-purity silicon nitride fibers have high insulating properties (for example, resistivity of 2 to $7 \times 10^{10} \Omega \cdot$cm) and favorable mechanical properties (for example, tensile strength of 30 to 220 kg/mm$^2$ and modulus of elasticity of 7 to 30 tons/mm$^2$). The fibers are useful as heat-resistant, highly insulating materials, or reinforcing agents for composite materials, in particular those for aerospace services. Further, the present invention provides a process for producing high-purity silicon nitride fibers having excellent properties on an industrial scale. It should be emphasized that the feed to the spinning step in the process of this invention exhibits a high spinnability, the effluent therefrom has a high solidifiability, and the fibers are produced at a very high ceramic yield.

What we claim is:

1. A continuous silicon nitride fiber consisting essentially of carbon of 5 weight percent or less, the remainder being amorphous silicon nitride, said fiber having a fiber size of 10 to 30 $\mu$m diameter, a tensile strength of 30 to 220 Kg/mm$^2$, a modulus of elasticity of 7 to 30 tons/mm$^2$, and a resistivity of 2 to $7 \times 10^{10} \Omega \cdot$cm.

2. A fiber according to claim 1, wherein the silicon nitride fiber comprises 55 to 70 weight percent silicon, 25 to 40 weight percent nitrogen and 5 weight percent or less carbon.

* * * * *